(12) United States Patent
Zhu et al.

(10) Patent No.: US 10,795,114 B2
(45) Date of Patent: Oct. 6, 2020

(54) LENS DRIVING APPARATUS

(71) Applicant: AAC Technologies Pte. Ltd., Singapore (SG)

(72) Inventors: Bingke Zhu, Shenzhen (CN); Kaiyan Gao, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 135 days.

(21) Appl. No.: 16/236,508

(22) Filed: Dec. 30, 2018

(65) Prior Publication Data
US 2019/0302398 A1 Oct. 3, 2019

(30) Foreign Application Priority Data

Mar. 27, 2018 (CN) .......................... 2018 1 0260110

(51) Int. Cl.
*G02B 7/09* (2006.01)
*G02B 7/02* (2006.01)

(52) U.S. Cl.
CPC ............... *G02B 7/09* (2013.01); *G02B 7/021* (2013.01); *G02B 7/026* (2013.01); *G03B 2205/0069* (2013.01)

(58) Field of Classification Search
CPC .......... G02B 7/02; G02B 7/021; G02B 7/025; G02B 7/022; G02B 7/026

USPC ......................................................... 359/819
See application file for complete search history.

(56) References Cited

U.S. PATENT DOCUMENTS

2018/0252893 A1* 9/2018 Park ..................... H02K 41/035
2019/0121055 A1* 4/2019 Lee .......................... G02B 7/08

* cited by examiner

*Primary Examiner* — Mohammed A Hasan
(74) *Attorney, Agent, or Firm* — IPro, PLLC; Na Xu

(57) ABSTRACT

The present disclosure provides a lens driving apparatus. The lens driving apparatus includes: a base; a first supporting frame supported by the base body; a second supporting frame supported by the first supporting frame; a third supporting frame covering and fixed to the second supporting frame and enclosing an accommodating space together with the second supporting frame; a barrel accommodated in the accommodating space and elastic members made of memory alloys and configured to drive the first supporting frame to move in a first direction with respect to the base body, drive the third supporting frame and the second supporting frame to move in a second direction with respect to the first supporting frame and drive the barrel to move in a direction of its optical axis. Any two of the first direction, the second direction and the direction of the optical axis are perpendicular to each other.

25 Claims, 12 Drawing Sheets

US 10,795,114 B2

LENS DRIVING APPARATUS

CROSS-REFERENCE TO RELATED APPLICATIONS

The present application claims priority to Chinese Patent Application No. 201810260110.X, filed on Mar. 27, 2018, the content of which is incorporated herein by reference in its entirety.

TECHNICAL FIELD

The present disclosure relates to a driving apparatus, and in particular, to a lens driving apparatus.

BACKGROUND

With the development of photographic technology, lens driving apparatuses have been widely applied in various photographic devices. Combinations of lens driving apparatuses with various portable electronic devices such as mobile phones, cameras and computers are get favored by consumers.

In the related art, a driver in a lens driving apparatus is typically a driving structure formed by a coil and a magnet. The coil and the magnet are fixed on a barrel and a housing, respectively and the barrel is supported by the housing via an elastic sheet. When a current is applied to the coil, the coil and the magnet generate an electromagnetic field. The coil, subject to an electromagnetic force, drives the magnet to move along a straight line, which in turn causes the barrel to move in a direction of an optical axis.

However, in the related art, the barrel moves subject to the electromagnetic force, which is vulnerable to interference of a magnetic field. An additional Hall element is required to detect shaking of the barrel. It may have a low reliability in some special circumstances.

There is thus a need for an improved lens driving apparatus to solve the above problem.

BRIEF DESCRIPTION OF DRAWINGS

In order to explain the solutions according to the embodiments of the present disclosure more clearly, the figures used in the description of the embodiments will be introduced briefly below. Obviously, the following figures only illustrate some of the embodiments of the present disclosure. Other figures can be obtained by those having ordinary skill in the art from these figures without any inventive efforts. In the figures.

DESCRIPTION OF EMBODIMENTS

In the following, the solutions according to the embodiments of the present disclosure will be described clearly and fully with reference to the figures. Obviously, the embodiments described below are only some, rather than all, of the embodiments of the present disclosure. All other embodiments that can be obtained by those skilled in the art from the embodiments described below without any inventive efforts are to be encompassed by the scope of the present disclosure.

Figure 1:
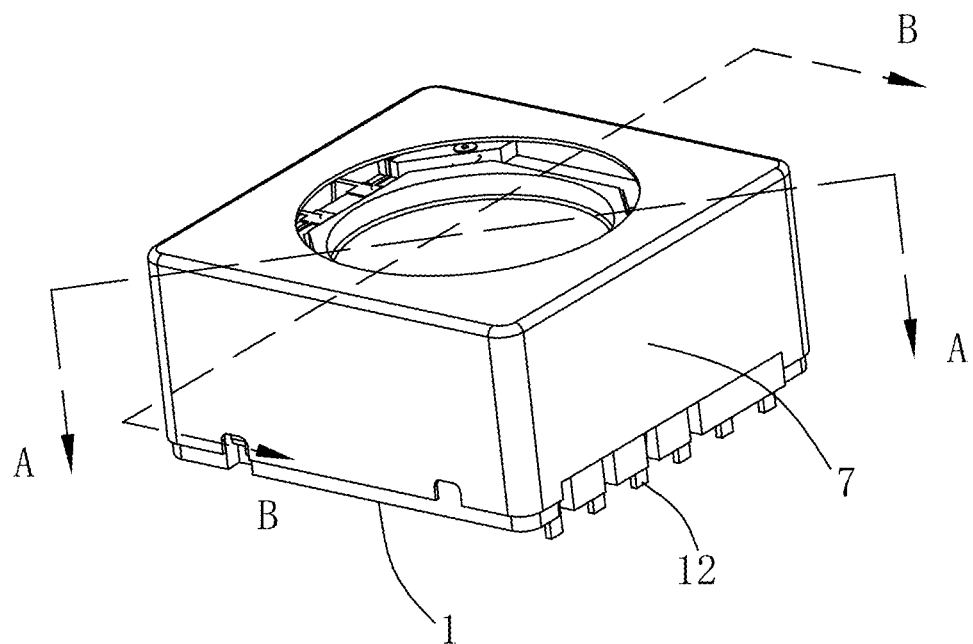
FIG. 1 is a schematic diagram showing a stereoscopic structure of a lens driving apparatus according to the present disclosure.
Figure 2:
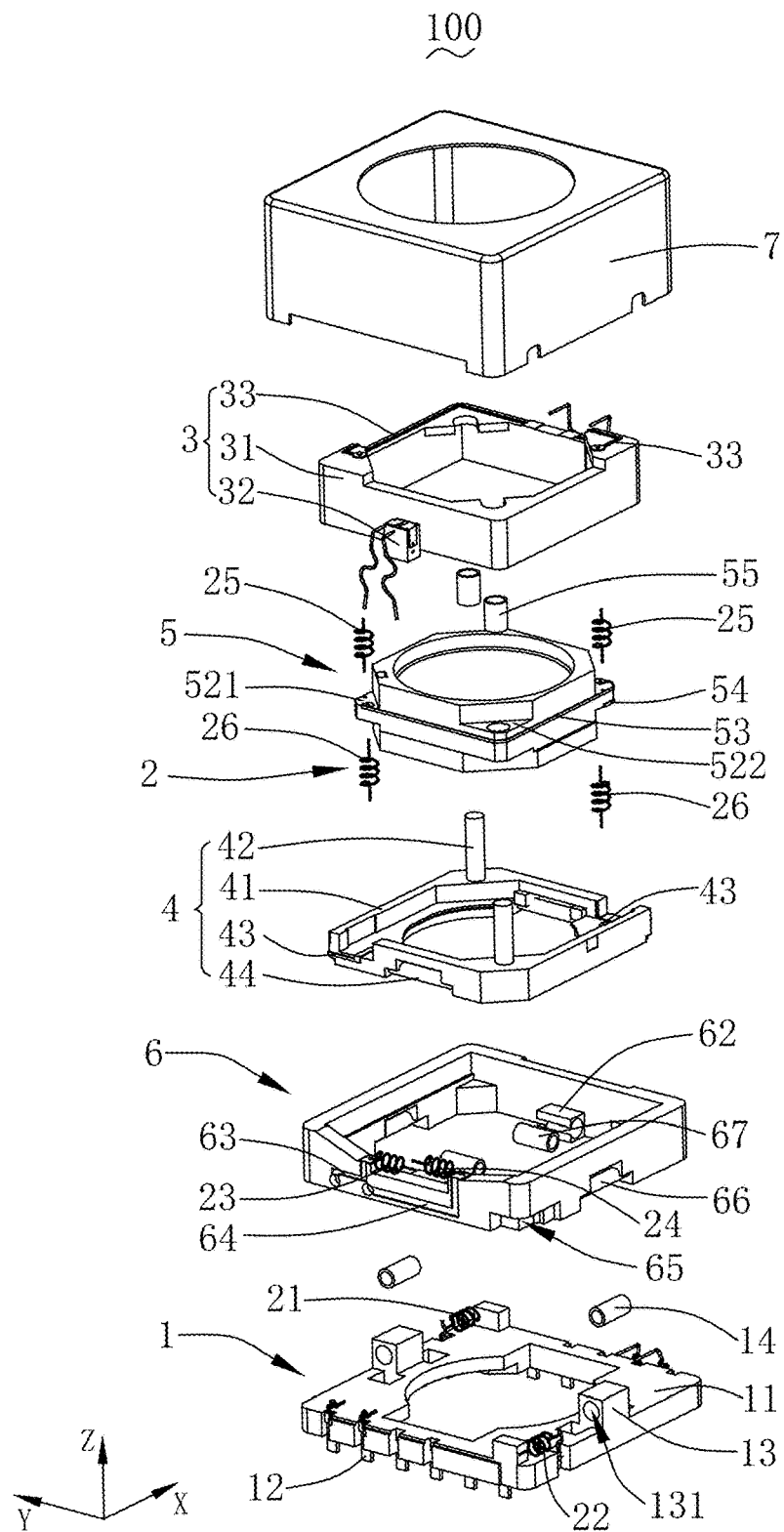
FIG. 2 is a schematic diagram showing an exploded structure of a lens driving apparatus according to the present disclosure.

Referring to FIGS. 1-2, FIG. 1 is a schematic diagram showing a stereoscopic structure of a lens driving apparatus according to the present disclosure, and FIG. 2 is a schematic diagram showing an exploded structure of a lens driving apparatus according to the present disclosure. According to the present disclosure, a lens driving apparatus 100 is provided according to the present disclosure. The lens driving apparatus 100 includes: a base 1, elastic members 2, a third supporting frame 3, a second supporting frame 4, a barrel 5, a first supporting frame 6 and a housing 7.

In this embodiment, for simplicity, it is assumed that every two of a direction of an optical axis, a first direction and a second direction are perpendicular to each other. That is, the direction of the optical axis is a direction of Z-axis, the first direction is a direction of Y-axis, and the second direction is a direction of Z-axis.

Figure 3:
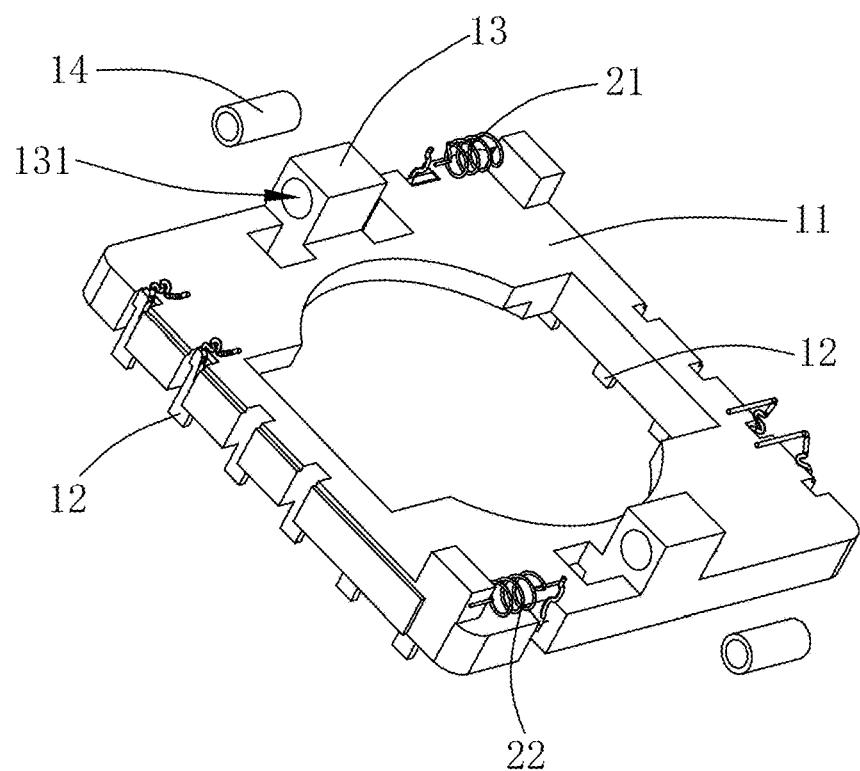
FIG. 3 is a schematic diagram showing a structure of a base of a lens driving apparatus according to the present disclosure.

Referring to FIG. 3, FIG. 3 is a schematic diagram showing a structure of a base of a lens driving apparatus according to the present disclosure. The base 1 includes a base body 11, a plurality of conductive terminals 12 provided in the base body 11 and insulated from each other, and a base supporting portion 13 extending from the base body 11 towards the first supporting frame 6.

The number of the conductive terminals 12 matches the number of the elastic members 2. Each conductive terminal provides an electrical signal to one elastic member 2. In this embodiment, there are twelve conductive terminals 12. In alternative embodiments, all or some of the twelve conduction terminals 12 can be combined into one.

The elastic members 2 are made of Shape Memory Alloys (SMAs) and include a first elastic member 21, a second elastic member 22, a third elastic member 23, a fourth elastic member 24, a fifth elastic member 25 and a sixth elastic member 26.

In this embodiment, each of the first elastic member 21, the second elastic member 22, the third elastic member 23, the fourth elastic member 24, the fifth elastic member 25 and the sixth elastic member 26 is a coil spring, as a non-limiting example.

The electrical signal provided by each elastic member 2 include a positive terminal and a negative terminal. Hence, the elastic members 2 match and are connected to the twelve conductive terminals 12. Of course, the present disclosure is not limited to this circuit connection and control.

Figure 4:
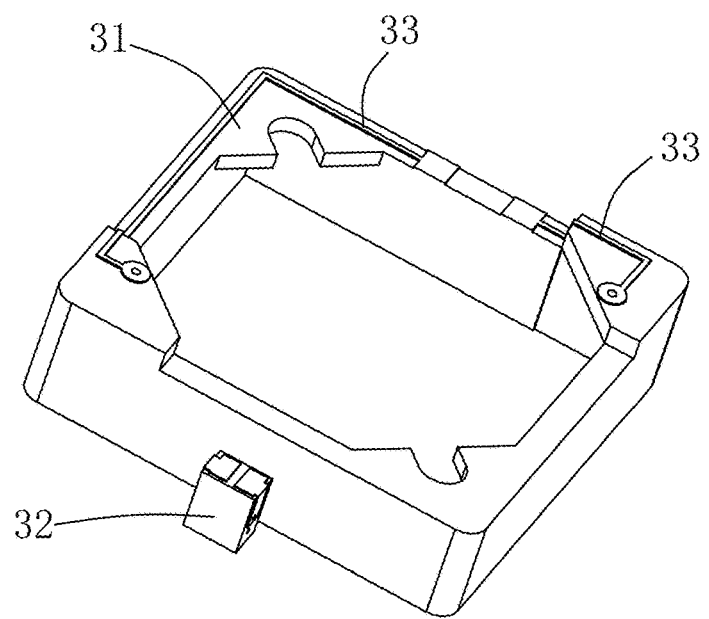
FIG. 4 is a schematic diagram showing a structure of a third supporting frame of a lens driving apparatus according to the present disclosure.
Figure 5:
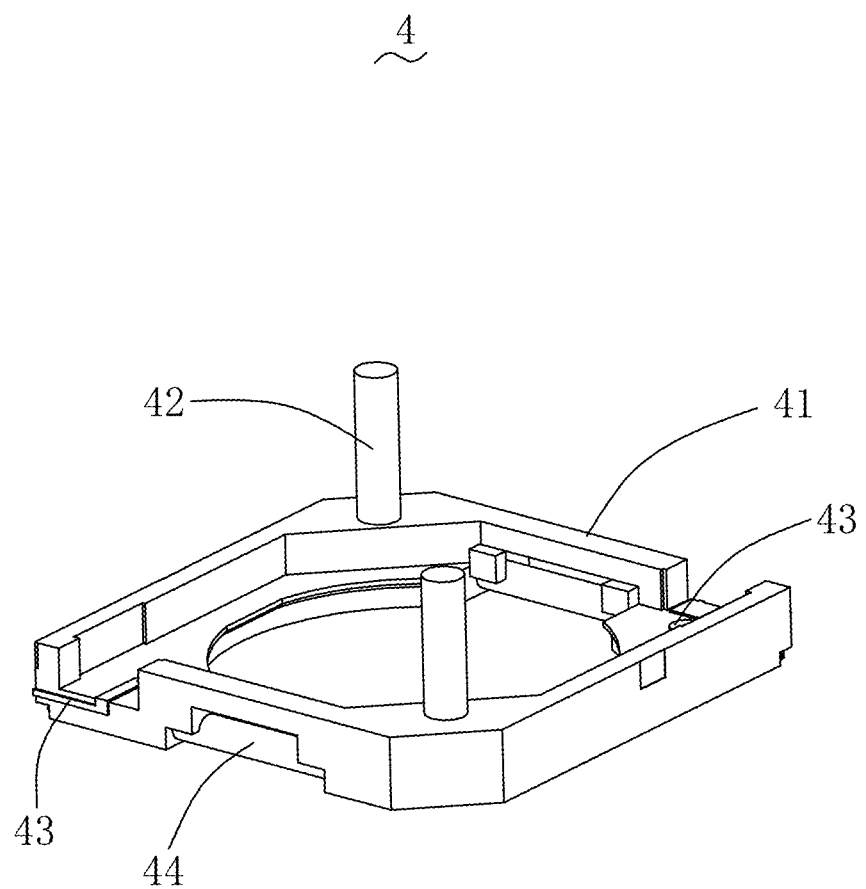
FIG. 5 is a schematic diagram showing a structure of a second supporting frame of a lens driving apparatus according to the present disclosure.
Figure 6:
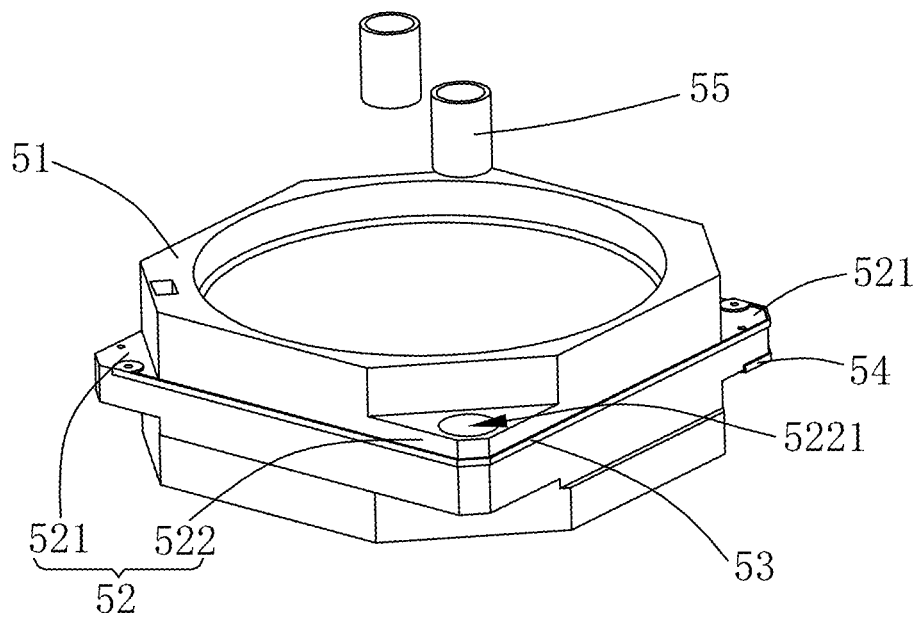
FIG. 6 is a schematic diagram showing a structure of a barrel of a lens driving apparatus according to the present disclosure.

Referring to FIGS. 4-6, FIG. 4 is a schematic diagram showing a structure of a third supporting frame of a lens driving apparatus according to the present disclosure, FIG. 5 is a schematic diagram showing a structure of a second supporting frame of a lens driving apparatus according to the present disclosure, and FIG. 6 is a schematic diagram showing a structure of a barrel of a lens driving apparatus according to the present disclosure. The barrel 5 can move in the direction of the optical axis (i.e., Z-axis), as described below.

The third supporting frame 3 covers and is fixed to the second supporting frame 4 and encloses an accommodating space together with the second supporting frame 4.

The third supporting frame 3 includes a third frame body 31, a third frame extending portion 32 extending from the third frame body 31 in a direction away from the optical axis, and two third leads 33, insulated from each other, on a surface of the third supporting frame 3.

The second supporting frame 4 includes a second frame body 41, a barrel guiding pole 42 arranged in the direction of the optical axis (Z-axis) and fixed to the second frame body 41, two fourth leads 43, insulated from each other, on a surface of the second supporting frame 4, and a second frame guiding pole 44 arranged in the second direction (Z-axis) and fixed to the second frame body 41.

The barrel guiding pole 42 extends in parallel with the optical axis. The barrel guiding pole 42 and the second frame body 41 can be formed in one piece by means of injection molding. Alternatively, the barrel guiding pole 42 can be glued to the second frame body 41.

The barrel 5 include a barrel body 51, barrel extending portions 52 extending from the barrel body 51 in a direction away from the optical axis, and a first lead 53 and a second lead 54, insulated from each other, on an outer surface of the barrel 5.

The barrel extending portions 52 include two first extending portions 521 and two second extending portions 522. As an example, the two first extending portions 521 and the two second extending portions 522 can be arranged separately and alternately.

Figure 7:
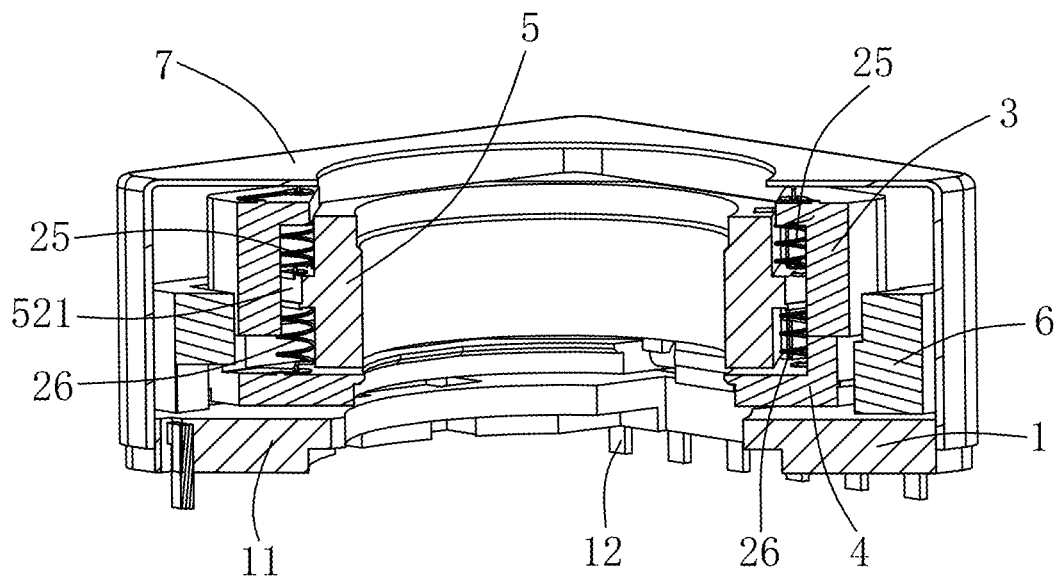
FIG. 7 is a schematic diagram showing a sectional structure along Line A-A in FIG. 1.
Figure 8:
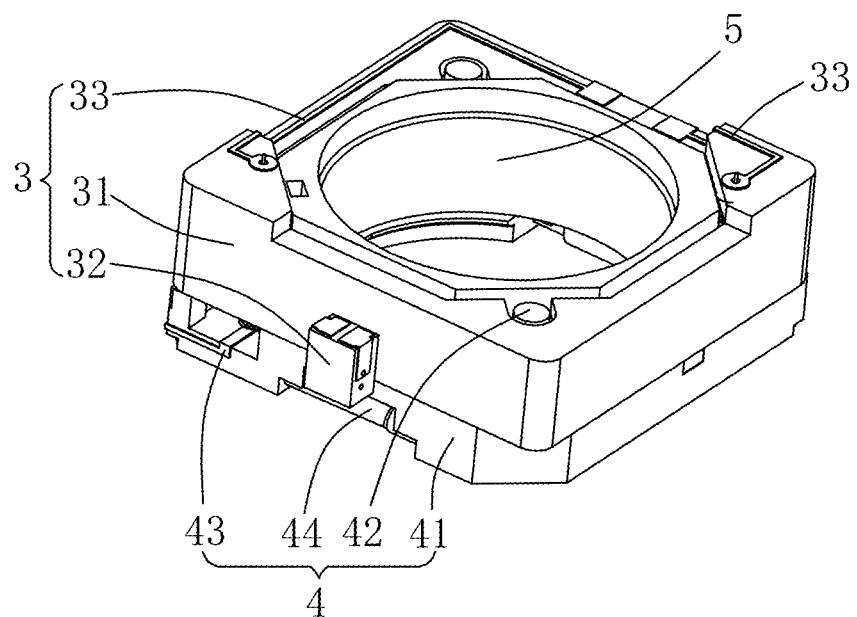
FIG. 8 is a schematic diagram showing an installation structure of a second supporting frame, a third supporting frame and a barrel of a lens driving apparatus according to the present disclosure.

Referring to FIGS. 7-8, FIG. 7 is a schematic diagram showing a sectional structure along Line A-A in FIG. 1, and FIG. 8 is a schematic diagram showing an installation structure of a second supporting frame, a third supporting frame and a barrel of a lens driving apparatus according to the present disclosure.

Each of the fifth elastic member 25 and the sixth elastic member 26 is fixed to the barrel extending portions 52 and they support the barrel in the air within the accommodating space 10.

In particular, the fifth elastic member 25 has one end fixed to the third supporting frame 3 and electrically connected to the conductive terminals 12 and another end fixed to the barrel 5, and configured to drive the barrel 5 to move in a positive or negative direction of the direction of its optical axis (Z-axis).

The sixth elastic member 26 has one end fixed to the second supporting frame 4 and electrically connected to the conductive terminals 12 and another end fixed to the barrel 5, and configured to drive the barrel 5 to move in the negative or positive direction of the direction of its optical axis (Z-axis).

In particular, in this embodiment, the elastic members include two fifth elastic members 25 each extending in the direction of the optical axis and fixed to a side of one the first extending portions 521 that is away from the base body 11 and two sixth elastic members 26 each extending in the direction of the optical axis and fixed to a side of one the first extending portions 521 close to the base body 11.

As an example, the barrel 5 has a rectangular outer wall and the two first extending portions 521 and the two second extending portions are provided at four corners of the barrel, respectively. The two first extending portions 521 are in one diagonal and the two second extending portions 522 are in another diagonal. When the two fifth elastic members 25 and the two sixth elastic members 26 are fixed to the two first extending portions 521, respectively, they form a symmetric structure, such that the barrel 5 can be more balanced while moving in the direction of the optical axis and thus has a higher reliability and a higher accuracy.

The second extending portions 522 each have a barrel guiding hole 5221 through it in the direction of the optical axis. The barrel guiding pole 42 is installed into the barrel guiding hole 5221. The barrel guiding hole 42 guides the barrel 5 to avoid deviation of the barrel 5 when it is moving in the direction of the optical axis (Z-axis) and make it move more easily, thereby effectively improving its reliability.

In order to reduce the resistance when the barrel 5 is moving, the barrel 5 may further include a first metal sleeve 55 attached and fixed to an inner wall of the barrel guiding hole 5221. The barrel guiding pole 42 is installed into the barrel guiding hole 5221 via the first metal sleeve 55. In this embodiment, the first metal sleeve 55 and the barrel 52 are formed in one piece by means of injection molding.

The first lead 53 has its two ends electrically connected to the two fifth elastic members 25, respectively, such that the two fifth elastic members 25 form a current loop. The second lead 54 has its two ends electrically connected to the two sixth elastic members 26, respectively, such that the two sixth elastic members 26 form a current loop.

The two fifth elastic members 25 are electrically connected to two of the conductive terminals 12 via the two third leads 33 provided on the surface of the third supporting frame 3 to form a current loop.

The two sixth elastic members 26 are electrically connected to two of the conductive terminals 12 via the two fourth leads 43 provided on the surface of the second supporting frame 4 to form a current loop.

Referring again to FIGS. 7-8, initially the barrel 5 is at the middle of its travel, such that it can move quickly to a desired position.

When the fifth elastic members 25 are SMA unidirectional compression springs, currents applied to the two conductive terminals 12 (positive and negative) connected to the fifth elastic members 25 flow to the fifth elastic members 25 via the two third leads 33. Due to the thermal effect, the crystal structures of the fifth elastic members 25 are converted from martensite to austenite, such that the fifth elastic members 25 start to contract to generate a contracting force, which overcomes a pulling force of the sixth elastic members 26, driving the barrel 5 to move in the positive direction of the direction of the optical axis (Z-axis). When the currents decrease or stop, the temperatures of the fifth elastic members 25 decrease and the fifth elastic members 25 extend and revert to their initial states. Alternatively, when the fifth elastic members 25 are SMA unidirectional extension springs, they drive the barrel 5 to move in the negative direction of the direction of the optical axis (Z-axis).

Similarly, when the six elastic members 26 are SMA unidirectional compression springs, currents applied to the two conductive terminals 12 (positive and negative) connected to the six elastic members 26 flow to the six elastic members 26 via the two fourth leads 43. Due to the thermal effect, the crystal structures of the fifth elastic members 25 are converted from martensite to austenite, such that the six elastic members 26 start to contract to generate a contracting force, which overcomes a pulling force of the fifth elastic members 25, driving the barrel 5 to move in the negative direction of the direction of the optical axis (Z-axis). When the currents decrease or stop, the temperatures of the six elastic members 26 decrease and the six elastic members 26 extend and revert to their initial states. This achieves an Automatic Focusing (AF) function of the lens driving apparatus 100. Alternatively, when the six elastic members 26 are SMA unidirectional extension springs, they drive the barrel 5 to move in the positive direction of the direction of the optical axis (Z-axis).

Moreover, since SMAs exhibit different resistances at different temperatures, a closed-loop control can be applied based on this characteristic. When the current is different, the temperature, position, and resistance also change, so the resistance can be matched with the position.

Application Scenario 1: the fifth elastic members 25 and the six elastic members 26 are both SMA unidirectional compression springs.

When the barrel 5 is in its original position, currents are applied to the sixth elastic members 26, such that the sixth elastic members 26 contract and drive the barrel 5 to move in the negative direction of the direction of the optical axis.

While the currents of the sixth elastic members 26 decrease, currents are applied to the fifth elastic members 25, and the fifth elastic members 25 start to contract and drive the barrel 5 to move in the positive direction of the direction of the optical axis, such that the barrel 5 can move from a maximum negative position to a maximum positive position.

When the fifth elastic members 25 have driven the barrel 5 to reach the maximum positive position, the currents of the fifth elastic members 25 decrease or stop and currents are applied to the sixth elastic members 26, and the sixth elastic members 26 start to contract and drive the barrel 5 move in the negative direction of the direction of the optical axis, such that the barrel 5 can move from the maximum positive position to the maximum negative position.

According to displacement and movement feedbacks required by actual products, different combinations of currents can be applied to the fifth elastic members 25 and the sixth elastic members 26, such that the barrel 5 can reach any position within its travel.

Application Scenario 2: the fifth elastic members 25 and the six elastic members 26 are both SMA unidirectional extension springs.

When the barrel 5 is in its original position, currents are applied to the sixth elastic members 26, such that the sixth elastic members 26 extend and drive the barrel 5 to move in the positive direction of the direction of the optical axis.

While the currents of the sixth elastic members 26 decrease, currents are applied to the fifth elastic members 25, and the fifth elastic members 25 start to extend and drive the barrel 5 move in the negative direction of the direction of the optical axis, such that the barrel 5 can move from a maximum positive position to a maximum negative position.

When the fifth elastic members 25 have driven the barrel 5 to reach the maximum negative position, the currents of the fifth elastic members 25 decrease or stop and currents are applied to the sixth elastic members 26, and the sixth elastic members 26 start to extend and drive the barrel 5 move in the positive direction of the direction of the optical axis, such that the barrel 5 can move from the maximum negative position to the maximum positive position.

According to displacement and movement feedbacks required by actual products, different combinations of currents can be applied to the fifth elastic members 25 and the sixth elastic members 26, such that the barrel 5 can reach any position within its travel.

Figure 9:
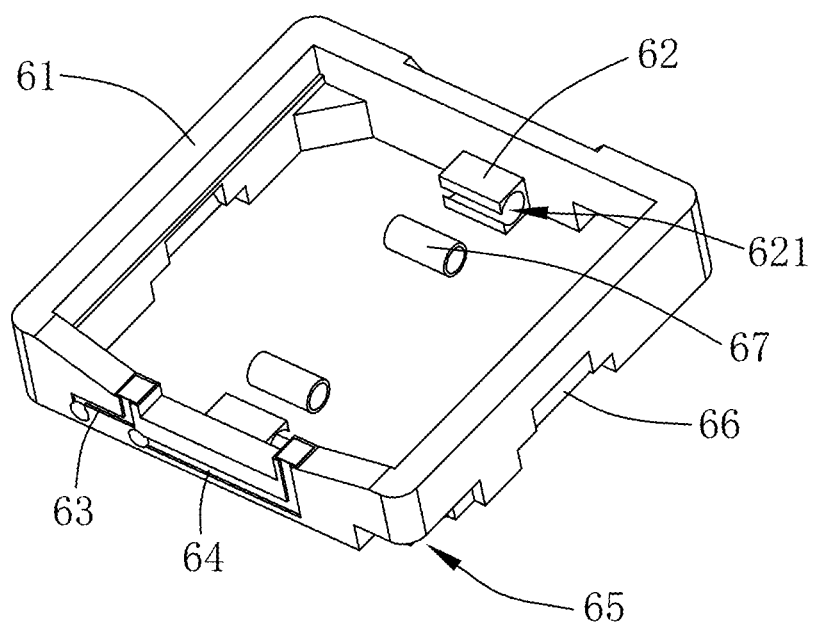
FIG. 9 is a schematic diagram showing a structure of a first supporting frame of a lens driving apparatus according to the present disclosure.
Figure 10:
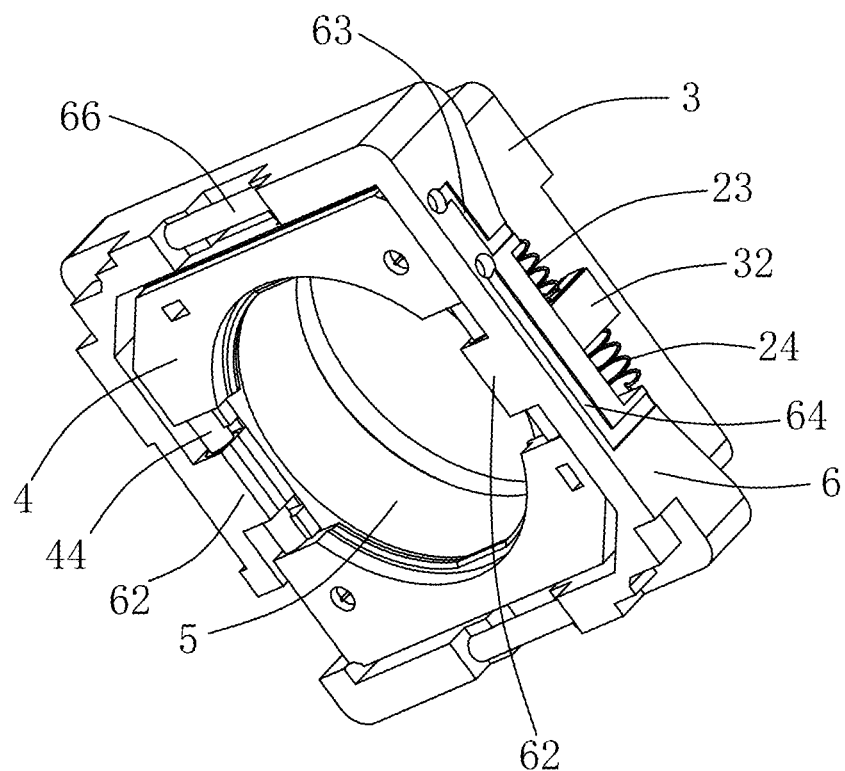
FIG. 10 is a schematic diagram showing an installation structure of a first supporting frame, a second supporting frame and a third supporting frame of a lens driving apparatus according to the present disclosure.

Referring to FIGS. 9-10, FIG. 9 is a schematic diagram showing a structure of a first supporting frame of a lens driving apparatus according to the present disclosure, and FIG. 10 is a schematic diagram showing an installation structure of a first supporting frame, a second supporting frame and a third supporting frame of a lens driving apparatus according to the present disclosure. The barrel 5 can move in the second direction (i.e., Y-axis direction), as described below.

The second supporting frame 4 is supported by the first supporting frame 6. As the third supporting frame 4 covers and is fixed to the second supporting frame 3, the second supporting frame 4 and the third supporting frame 3 are both supported by the first supporting frame 6.

The first supporting frame 6 includes a first frame body 61, a first frame extending portion 62 extending from the first frame body 61 in a direction towards the optical axis, a fifth lead f63 and a sixth lead 64, insulated from each other, on a surface of the first supporting frame 6, two accommodating slots 65 that are concave in the first frame body 61, and a first frame guiding pole 66 arranged in the first direction (X-axis direction) and fixed to the first frame body 61.

The third elastic member 23 and the fourth elastic member are fixed to two opposite sides of the third frame extending portion 32 in parallel with the second direction (Y-axis direction), respectively.

In particular, the third elastic member 23 has one end fixed to the first supporting frame 6 and electrically connected to two of the conductive terminals (positive and negative) and another end fixed to the third supporting frame 3 (in particular to one side of the third frame extending portion 32), and configured to drive the third supporting frame 3 and the second supporting frame 4 to move in a positive or negative direction of the second direction (Y-axis direction) with respect to the first supporting frame 6.

The fourth elastic member 24 has one end fixed to the first supporting frame 6 and electrically connected to two of the conductive terminals (positive and negative) and another end fixed to the third supporting frame 3 (in particular to the one side of the third frame extending portion 32), and configured to drive the third supporting frame 3 and the second supporting frame 4 to move in the negative or positive direction of the second direction (Y-axis direction) with respect to the first supporting frame 6.

In this embodiment, the third elastic member 23 is electrically connected to two of the conductive terminals 12 via the fifth lead 63 provided on the first supporting frame 6. The fourth elastic member 24 is electrically connected to two of the conductive terminals 12 via the sixth lead 64 provided on the first supporting frame 6.

As an example, the first frame extending portion 62 has a first frame guiding hole 621 through it in the second direction. The second frame guiding pole 44 of the second supporting frame 4 is installed into the first frame guiding hole 621.

The second frame guiding pole 44 guides the second supporting frame 4 to avoid deviation of the second supporting frame 4 when it is moving in the second direction (Y-axis direction) and make it move more easily, thereby effectively improving its reliability.

In order to reduce the resistance when the second supporting frame 4 is moving with respect to the first supporting frame 6, the first supporting frame 6 can further include a second metal sleeve 67 attached and fixed to an inner wall of the first frame guiding hole 621. The second frame guiding pole 44 is installed into the first frame guiding hole 621 via the second metal sleeve 67. In this embodiment, the second metal sleeve 67 and the first supporting frame 6 are formed in one piece by means of injection molding.

In this embodiment, the first supporting frame 6 includes two first frame extending portions 62 arranged in parallel with the second direction on two opposite sides of the first frame body 61, respectively. This structure allows the first supporting frame to support the second supporting frame 4 more steadily and stably.

Referring again to FIG. 10, initially the second supporting frame 4 is at the middle of its travel, such that it can move quickly to a desired position.

When the third elastic member 23 is an SMA unidirectional compression spring, a current applied to the two conductive terminals 12 (positive and negative) connected to the third elastic member 23 flows to the third elastic member 23 via the two fifth leads 63. Due to the thermal effect, the crystal structure of the third elastic member 23 is converted from martensite to austenite, such that the third elastic member 23 starts to contract to generate a contracting force, which overcomes a pulling force of the fourth elastic member 24, driving the third supporting frame 4 and thus the barrel 5 to move in the positive direction of the second direction (Y-axis direction). When the currents decrease or stop, the temperature of the third elastic member 23 decreases and the third elastic member 23 extends and reverts to its initial state. Alternatively, when the third elastic member 23 is an SMA unidirectional extension spring, it drives the barrel 5 to move in the negative direction of the second direction (Y-axis direction).

Similarly, when the fourth elastic member 24 is an SMA unidirectional compression spring, a current applied to the two conductive terminals 12 (positive and negative) connected to the fourth elastic member 24 flows to the fourth elastic member 24 via the two sixth leads 64. Due to the thermal effect, the crystal structure of the fourth elastic member 24 is converted from martensite to austenite, such that the fourth elastic member 24 starts to contract to generate a contracting force, which overcomes a pulling force of the third elastic member 23, driving the third supporting frame 4 and thus the barrel 5 to move in the negative direction of the second direction (Y-axis direction). When the currents decrease or stop, the temperature of the fourth elastic member 24 decreases and the fourth elastic member 24 extends and reverts to its initial state. Alternatively, when the fourth elastic member 24 is an SMA unidirectional extension spring, it drives the barrel 5 to move in the positive direction of the second direction (Y-axis direction).

The above structure achieves an Optical Image Stabilization (OIS) function in the Y-axis direction, i.e., OIS-Y, of the lens driving apparatus 100.

Moreover, since SMAs exhibit different resistances at different temperatures, a closed-loop control can be applied based on this characteristic. When the current is different, the temperature, position, and resistance also change, so the resistance can be matched with the position.

Application Scenario 1: the third elastic member 23 and the fourth elastic member 24 are both SMA unidirectional compression springs.

When the barrel 5 is in its original position, a current is applied to the third elastic member 23, such that the third elastic member 23 contracts and drives the barrel 5 to move in the positive direction of the second direction (Y-axis direction).

While the current of the third elastic member 23 decreases, a current is applied to the fourth elastic member 24, and the fourth elastic member 24 starts to contract and drives the barrel 5 to move in the negative direction of the second direction (Y-axis direction), such that the barrel 5 can move from a maximum positive position to a maximum negative position.

When the fourth elastic member 24 has driven the barrel 5 to reach the maximum negative position, the current of the fourth elastic member 24 decreases or stops and a current is applied to the third elastic member 23, and the third elastic member 23 starts to contract and drives the barrel 5 move in the positive direction of the second direction (Y-axis direction), such that the barrel 5 can move from the maximum negative position to the maximum positive position.

According to displacement and movement feedbacks required by actual products, different combinations of currents can be applied to the third elastic member 23 and the fourth elastic member 24, such that the barrel 5 can reach any position within its travel.

Application Scenario 2: the third elastic member 23 and the fourth elastic member 24 are both SMA unidirectional extension springs.

When the barrel 5 is in its original position, a current is applied to the third elastic member 23, such that the third elastic member 23 extends and drives the barrel 5 to move in the negative direction of the second direction (Y-axis direction).

While the current of the third elastic member 23 decreases, a current is applied to the fourth elastic member 24, and the fourth elastic member 24 starts to extend and drives the barrel 5 to move in the positive direction of the second direction (Y-axis direction), such that the barrel 5 can move from a maximum negative position to a maximum positive position.

When the fourth elastic member 24 has driven the barrel 5 to reach the maximum positive position, the current of the fourth elastic member 24 decreases or stops and a current is applied to the third elastic member 23, and the third elastic member 23 starts to extend and drives the barrel 5 move in the negative direction of the second direction (Y-axis direction), such that the barrel 5 can move from the maximum positive position to the maximum negative position.

According to displacement and movement feedbacks required by actual products, different combinations of currents can be applied to the third elastic member 23 and the fourth elastic member 24, such that the barrel 5 can reach any position within its travel. It is to be noted here that the electrical connections between the third elastic member 23 and the fourth elastic member 24 and the conductive terminals 12 are not limited to the fifth leads 63 and the sixth leads 64. Their positive and negative terminals can be electrically connected to the conductive terminals 12 via external leads, which is also feasible and convenient for wiring. Such electrical connections are well known in the related art and can be contemplated by those skilled in the art, and thus details thereof will be omitted here.

Figure 11:
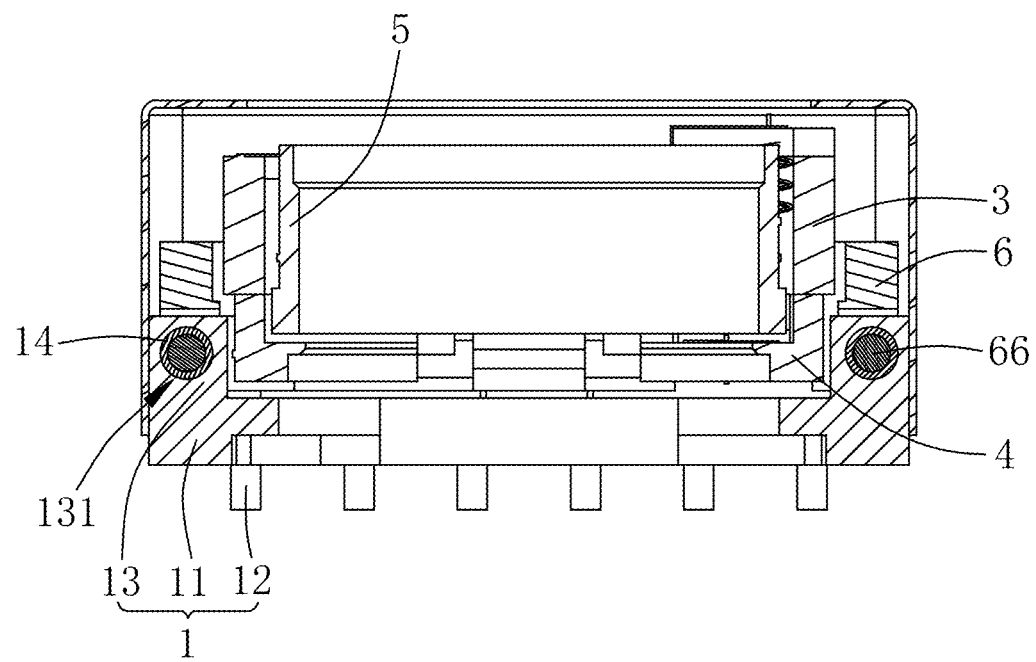
FIG. 11 is a schematic diagram showing a sectional structure along Line B-B in FIG. 1.
Figure 12:
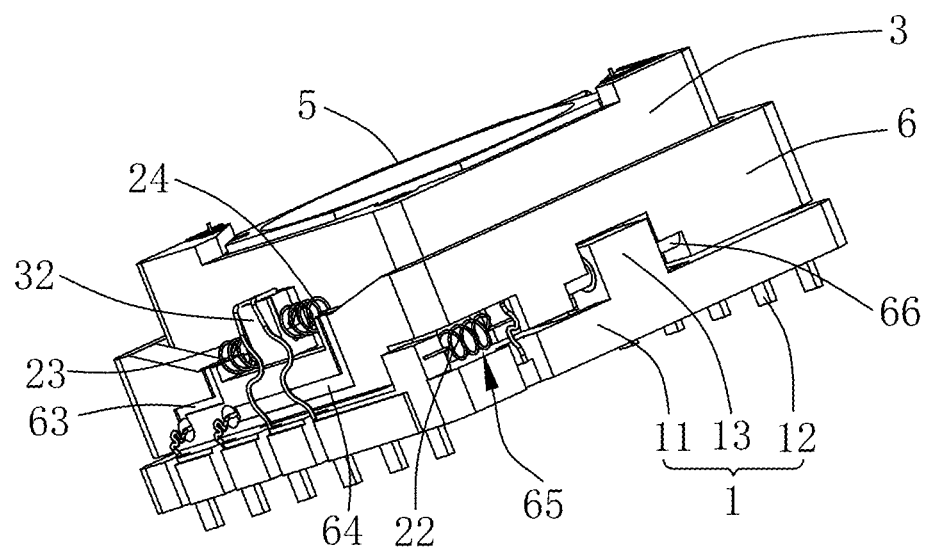
FIG. 12 is a schematic diagram showing an installation structure of a first supporting frame, a second supporting frame, a third supporting frame and a base of a lens driving apparatus according to the present disclosure.

Referring to FIGS. 3, 11 and 12, FIG. 11 is a schematic diagram showing a sectional structure along Line B-B in FIG. 1, and FIG. 12 is a schematic diagram showing an installation structure of a first supporting frame, a second supporting frame, a third supporting frame and a base of a lens driving apparatus according to the present disclosure. The barrel 5 can move in the first direction (i.e., X-axis direction), as described below.

The first supporting frame 6 is supported by the base body 11 of the base 1.

The first elastic member 21 has one end fixed to the base body 11 and electrically connected to two of the conductive terminals 12 (positive and negative) and another end fixed to the first supporting frame 6, and configured to drive the first supporting frame 6 to move in a positive or negative direction of the first direction (X-axis direction) with respect to the base body 11.

The second elastic member 22 has one end fixed to the base body 11 and electrically connected to two of the conductive terminals 12 (positive and negative) and another end fixed to the first supporting frame 6, and configured to drive the first supporting frame 6 to move in the negative or positive direction of the first direction (X-axis direction) with respect to the base body 11.

In particular, the two accommodating slots 65 provided on the first frame body 61 extend in parallel with the first direction. In this embodiment, the two accommodating slots 6 are provided on opposite sides of the first frame body 61.

The first elastic member 21 and the second elastic member 22 are arranged both in the first direction, accommodated in the two accommodating slots 65, respectively, and fixed to the first supporting frame 61.

As an example, the base supporting portion 13 has a base guiding hole 131 through it in the first direction (X-axis direction). The first frame guiding pole 66 of the first supporting frame 6 is installed into the base guiding hole 131.

The first frame guiding pole 66 guides the first supporting frame 4 to avoid deviation of the first supporting frame 6 when it is moving in the first direction (X-axis direction) and make it move more easily, thereby effectively improving its reliability.

In order to reduce the resistance when the first supporting frame 6 is moving with respect to the base 1, the base 1 further includes a third metal sleeve 14 attached and fixed to an inner wall of the base guiding hole 131. The first frame guiding pole 66 is installed into the base guiding hole 131 via the third metal sleeve 14. In this embodiment, the third metal sleeve 14 and the base 1 are formed in one piece by means of injection molding.

In this embodiment, the base 1 includes two base supporting portions 13 arranged in parallel with the first direction on two opposite sides of the base body 11, respectively. This structure allows the base 1 to support the first supporting frame 6 more steadily and stably.

Initially, the first supporting frame 6 is at the middle of its travel, such that it can move quickly to a desired position.

When the first elastic member 21 is an SMA unidirectional compression spring, a current applied to the two conductive terminals 12 (positive and negative) connected to the first elastic member 21 flows to the first elastic member 21. Due to the thermal effect, the crystal structure of the first elastic member 21 is converted from martensite to austenite, such that the first elastic member 21 starts to contract to generate a contracting force, which overcomes a pulling force of the second elastic member 22, driving the first supporting frame 6 and thus the barrel 5 to move in the positive direction of the first direction (X-axis direction). When the currents decrease or stop, the temperature of the first elastic member 21 decreases and the first elastic member 21 extends and reverts to its initial state. Alternatively, when the first elastic member 21 is an SMA unidirectional extension spring, it drives the barrel 5 to move in the negative direction of the first direction (X-axis direction).

Similarly, when the second elastic member 22 is an SMA unidirectional compression spring, a current applied to the two conductive terminals 12 (positive and negative) connected to the second elastic member 22 flows to the second elastic member 22. Due to the thermal effect, the crystal structure of the second elastic member 22 is converted from martensite to austenite, such that the second elastic member 22 starts to contract to generate a contracting force, which overcomes a pulling force of the first elastic member 21, driving the first supporting frame 6 and thus the barrel 5 to move in the negative direction of the first direction (X-axis direction). When the currents decrease or stop, the temperature of the second elastic member 22 decreases and the second elastic member 22 extends and reverts to its initial state. The above structure achieves an OIS function in the X-axis direction, i.e., OIS-X, of the lens driving apparatus 100. Alternatively, when the second elastic member 22 is an SMA unidirectional extension spring, it drives the barrel 5 to move in the positive direction of the first direction (X-axis direction).

Moreover, since SMAs exhibit different resistances at different temperatures, a closed-loop control can be applied based on this characteristic. When the current is different, the temperature, position, and resistance also change, so the resistance can be matched with the position.

Application Scenario 1: the first elastic member 21 and the second elastic member 22 are both SMA unidirectional compression springs.

When the barrel 5 is in its original position, a current is applied to the first elastic member 21, such that the first elastic member 21 contracts and drives the barrel 5 to move in the positive direction of the first direction (X-axis direction).

While the current of the first elastic member 21 decreases, a current is applied to the second elastic member 22, and the second elastic member 22 starts to contract and drives the barrel 5 to move in the negative direction of the first direction, such that the barrel 5 can move from a maximum positive position to a maximum negative position.

When the second elastic member 22 has driven the barrel 5 to reach the maximum negative position, the current of the second elastic member 22 decreases or stops and a current is applied to the first elastic member 21, and the first elastic member 21 starts to contract and drives the barrel 5 move in the positive direction of the first direction, such that the barrel 5 can move from the maximum negative position to the maximum positive position.

According to displacement and movement feedbacks required by actual products, different combinations of currents can be applied to the first elastic member 21 and the second elastic member 22, such that the barrel 5 can reach any position within its travel.

Application Scenario 2: the first elastic member 21 and the second elastic member 22 are both SMA unidirectional extension springs.

When the barrel 5 is in its original position, a current is applied to the first elastic member 21, such that the first elastic member 21 extends and drives the barrel 5 to move in the negative direction of the first direction (X-axis direction).

While the current of the first elastic member 21 decreases, a current is applied to the second elastic member 22, and the second elastic member 22 starts to extend and drives the barrel 5 to move in the positive direction of the first direction, such that the barrel 5 can move from a maximum negative position to a maximum positive position.

When the second elastic member 22 has driven the barrel 5 to reach the maximum positive position, the current of the second elastic member 22 decreases or stops and a current is applied to the first elastic member 21, and the first elastic member 21 starts to extend and drives the barrel 5 move in the negative direction of the first direction, such that the barrel 5 can move from the maximum positive position to the maximum negative position.

According to displacement and movement feedbacks required by actual products, different combinations of currents can be applied to the first elastic member 21 and the second elastic member 22, such that the barrel 5 can reach any position within its travel.

The housing 7 covers the base body 11. The first supporting frame 6, the second supporting frame 4, the third supporting frame 3 and the barrel 5 are all accommodated and fixed within the housing 7.

The above structure achieves AF and OIS functions in the directions of the three axes of the lens driving apparatus with higher reliability and accuracy.

It is to be noted here that the first lead 53, the second lead 54, the third lead 33, the fourth lead 43, the fifth lead 63 and the sixth lead 64 are processed and formed by means of Laser Direct Structuring (LDS), such that the respective leads do not add to the thickness of the device such as the barrel 5. In this way, the lens driving apparatus can be made thinner, which facilitates the miniaturization of the product. Further, the LDS process can be applied in batch processing.

Compared with the related art, in the lens driving apparatus according to the present disclosure, the third supporting frame covers and is fixed to the second supporting frame and encloses an accommodating space together with the second supporting frame. The fifth elastic member and the sixth elastic member together support the barrel in the air within the accommodating space and drive it to move in a positive or negative direction of the direction of the optical axis, thereby providing the AF function. The second supporting frame is supported by the first supporting frame. The third elastic member and the fourth elastic member together drive the third supporting frame and thus the barrel to move in a positive or negative direction of the second direction, thereby providing the OIS function in the horizontal (Y) direction, i.e., OIS-Y. The first supporting frame is supported by the base body. The first elastic member and the second elastic member together drive the first supporting frame and thus the barrel to move in a positive or negative direction of the first direction, thereby providing the OIS function in the horizontal (X) direction, i.e., OIS-X. Since all the elastic members are made of SMAs, a structure of coils and magnets can be omitted while achieving the AF and OIS functions of the barrel. It is possible to avoid influence of an external magnetic field and effectively improve the reliability of the lens driving apparatus. The above structure is simple, easy to install and has a high production efficiency.

While the embodiments of the present disclosure have been described above, various modifications can be made by those skilled in the art without departing from the principle of the present disclosure. These modifications are to be encompassed by the scope of the present disclosure.

What is claimed is:

1. A lens driving apparatus, comprising:
a base comprising a base body and a plurality of conductive terminals provided in the base body and insulated from each other;
a first supporting frame supported by the base body;
a second supporting frame supported by the first supporting frame;
a third supporting frame covering and fixed to the second supporting frame and enclosing an accommodating space together with the second supporting frame;
a barrel accommodated in the accommodating space; and
elastic members made of memory alloys and comprising:
a first elastic member having one end fixed to the base body and electrically connected to the plurality of conductive terminals and another end fixed to the first supporting frame, and configured to drive the first supporting frame to move in a positive or negative direction of a first direction with respect to the base body;
a second elastic member having one end fixed to the base body and electrically connected to the plurality of conductive terminals and another end fixed to the first supporting frame, and configured to drive the first supporting frame to move in the negative or positive direction of the first direction with respect to the base body;
a third elastic member having one end fixed to the first supporting frame and electrically connected to the plurality of conductive terminals and another end fixed to the third supporting frame, and configured to drive the third supporting frame and the second supporting frame to move in a positive or negative direction of a second direction with respect to the first supporting frame;
a fourth elastic member having one end fixed to the first supporting frame and electrically connected to the plurality of conductive terminals and another end fixed to the third supporting frame, and configured to drive the third supporting frame and the second supporting frame to move in the negative or positive direction of the second direction with respect to the first supporting frame;
a fifth elastic member having one end fixed to the third supporting frame and electrically connected to the plurality of conductive terminals and another end fixed to the barrel, and configured to drive the barrel to move in a positive or negative direction of a direction of an optical axis of the barrel; and
a sixth elastic member having one end fixed to the second supporting frame and electrically connected to the plurality of conductive terminals and another end fixed to the barrel, and configured to drive the barrel to move in the negative or positive direction of the direction of the optical axis,
wherein any two of the first direction, the second direction and the direction of the optical axis are perpendicular to each other.

2. The lens driving apparatus as described in claim 1, wherein the barrel comprises a barrel body and at least one barrel extending portion extending from the barrel body in a direction away from the optical axis, and each of the fifth elastic member and the sixth elastic member is fixed to the at least one barrel extending portion.

3. The lens driving apparatus as described in claim 2, wherein the at least one barrel extending portion comprises two first extending portions, and the elastic members comprise two fifth elastic members each extending in the direction of the optical axis and fixed to a side of one of the two first extending portions that is away from the base body and two sixth elastic members each extending in the direction of the optical axis and fixed to a side of one of the two first extending portions close to the base body.

4. The lens driving apparatus as described in claim 3, wherein a first lead and a second lead, insulated from each other, are provided on an outer surface of the barrel, the first lead has its two ends electrically connected to the two fifth elastic members, respectively, to form a current loop, and the second lead has its two ends electrically connected to the two sixth elastic members, respectively, to form a current loop.

5. The lens driving apparatus as described in claim 4, wherein two third leads, insulated from each other, are provided on a surface of the third supporting frame, and the two fifth elastic members are electrically connected to the plurality of conductive terminals via the two third leads.

6. The lens driving apparatus as described in claim 4, wherein two fourth leads, insulated from each other, are provided on a surface of the second supporting frame, and the two sixth elastic members are electrically connected to the plurality of conductive terminals via the two fourth leads.

7. The lens driving apparatus as described in claim 3, wherein the at least one barrel extending portion comprises two second extending portions each comprising a barrel guiding hole through it in the direction of the optical axis, the second supporting frame comprises a second frame body and a barrel guiding pole arranged in the direction of the optical axis and fixed to the second frame body, and the barrel guiding pole is installed into the barrel guiding hole.

8. The lens driving apparatus as described in claim 7, wherein the two first extending portions and the two second extending portions are arranged separately and alternately.

9. The lens driving apparatus as described in claim 8, wherein the barrel has a rectangular outer wall and the at least one barrel extending portion is provided at four corners of the barrel, and wherein the two first extending portions are in one diagonal and the two second extending portions are in another diagonal.

10. The lens driving apparatus as described in claim 7, wherein the barrel further comprises a first metal sleeve attached and fixed to an inner wall of the barrel guiding hole, and the barrel guiding pole is installed into the barrel guiding hole via the first metal sleeve.

11. The lens driving apparatus as described in claim 10, wherein the first metal sleeve and the barrel are formed in one piece by means of injection molding.

12. The lens driving apparatus as described in claim 1, wherein the third supporting frame comprises a third frame body and a third frame extending portion extending from the third frame body in a direction away from the optical axis, and the third elastic member and the fourth elastic member are fixed to two opposite sides of the third frame extending portion in parallel with the second direction, respectively.

13. The lens driving apparatus as described in claim 12, wherein a fifth lead and a sixth lead, insulated from each other, are provided on a surface of the first supporting frame, and the third elastic member and the fourth elastic member are electrically connected to the plurality of conductive terminals via the fifth lead and the sixth lead, respectively.

14. The lens driving apparatus as described in claim 12, wherein the first supporting frame comprises a first frame body and a first frame extending portion extending from the first frame body in a direction towards the optical axis, the first frame extending portion having a first frame guiding hole through it in the second direction, the second supporting frame comprises a second frame body and a second frame guiding pole arranged in the second direction and fixed to the second frame body, and the second frame guiding pole is installed into the first frame guiding hole.

15. The lens driving apparatus as described in claim 14, wherein the first supporting frame comprises two first frame extending portions arranged in parallel with the second direction on two opposite sides of the first frame body, respectively.

16. The lens driving apparatus as described in claim 14, wherein the first supporting frame further comprises a second metal sleeve attached and fixed to an inner wall of the first frame guiding hole, and the second frame guiding pole is installed into the first frame guiding hole via the second metal sleeve.

17. The lens driving apparatus as described in claim 14, wherein the second metal sleeve and the first supporting frame are formed in one piece by means of injection molding.

18. The lens driving apparatus as described in claim 1, wherein the first supporting frame comprises a first frame body and two accommodating slots that are concave in the first frame body and extend in parallel with the first direction, and the first elastic member and the second elastic member are arranged both in the first direction, accommodated in the two accommodating slots respectively and fixed to the first frame body.

19. The lens driving apparatus as described in claim 18, wherein the two accommodating slots are arranged in parallel with the first direction on two opposite sides of the first frame body, respectively.

20. The lens driving apparatus as described in claim 19, wherein the base further comprises a base supporting portion extending from the base body towards the first supporting frame, the base supporting portion having a base guiding hole through it in the first direction, the first supporting frame further comprises a first frame guiding pole arranged in the first direction and fixed to the first frame body, and the first frame guiding pole is installed into the base guiding hole.

21. The lens driving apparatus as described in claim 20, wherein the base comprises two base supporting portions arranged in parallel with the first direction on two opposite sides of the base body, respectively.

22. The lens driving apparatus as described in claim 20, wherein the base further comprises a third metal sleeve attached and fixed to an inner wall of the base guiding hole, and the first frame guiding pole is installed into the base guiding hole via the third metal sleeve.

23. The lens driving apparatus as described in claim 16, wherein the third metal sleeve and the base are formed in one piece by means of injection molding.

24. The lens driving apparatus as described in claim 1, further comprising a housing covering the base body, wherein the first supporting frame, the second supporting frame, the third supporting frame and the barrel are all accommodated and fixed within the housing.

25. The lens driving apparatus as described in claim 1, wherein each of the first elastic member, the second elastic member, the third elastic member, the fourth elastic member, the fifth elastic member and the sixth elastic member is a coil spring.

* * * * *